United States Patent
Fu et al.

(10) Patent No.: US 9,580,228 B2
(45) Date of Patent: *Feb. 28, 2017

(54) THERMALLY ACTIVATABLE INSULATING PACKAGING

(71) Applicant: LBP Manufacturing LLC, Cicero, IL (US)

(72) Inventors: Thomas Z. Fu, Naperville, IL (US); Matthew R. Cook, Oak Brook, IL (US)

(73) Assignee: LBP Manufacturing LLC, Cicero, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,804

(22) Filed: Jun. 15, 2015

(65) Prior Publication Data

US 2015/0353264 A1    Dec. 10, 2015

Related U.S. Application Data

(63) Continuation of application No. 11/728,973, filed on Mar. 27, 2007, now Pat. No. 9,056,712.

(60) Provisional application No. 60/789,297, filed on Apr. 3, 2006.

(51) Int. Cl.
| | |
|---|---|
| *B65D 81/38* | (2006.01) |
| *A47J 41/00* | (2006.01) |
| *B31B 1/74* | (2006.01) |
| *A47G 19/22* | (2006.01) |

(52) U.S. Cl.
CPC ..... *B65D 81/3823* (2013.01); *A47G 19/2205* (2013.01); *A47J 41/0055* (2013.01); *A47J 41/0072* (2013.01); *B31B 1/74* (2013.01); *B65D 81/3869* (2013.01); *B65D 81/3874* (2013.01); *B65D 81/3886* (2013.01)

(58) Field of Classification Search
USPC ............... 229/403, 146, 103.11; 428/168; 206/485.1
See application file for complete search history.

(56) References Cited

U.S. PATENT DOCUMENTS

| | | | |
|---|---|---|---|
| 1,295,300 | A | 2/1919 | Galibert |
| 2,661,889 | A | 12/1953 | Phinney |

(Continued)

FOREIGN PATENT DOCUMENTS

| | | |
|---|---|---|
| CA | 2647912 A1 | 11/2007 |
| CA | 2766553 | 12/2010 |

(Continued)

OTHER PUBLICATIONS

International Search Report and Written Opinion dated Sep. 13, 2007 for corresponding International Application No. PCT/US2007/007521 (7 pages).

(Continued)

*Primary Examiner* — Christopher Demeree
(74) *Attorney, Agent, or Firm* — Fitch, Even, Tabin & Flannery LLP

(57) ABSTRACT

A package or container includes a side wall, the side wall having an inner surface and an outer surface. At least one of the inner surface or the outer surface of the side wall may be at least partially coated by a layer of a thermally expandable material. The material may be adapted to be expanded to provide thermal insulation.

38 Claims, 9 Drawing Sheets

(56) References Cited

U.S. PATENT DOCUMENTS

| | | | |
|---|---|---|---|
| 2,853,222 A * | 9/1958 | Gallagher | B65D 3/14 126/9 A |
| 2,998,501 A | 8/1961 | Edberg et al. | |
| 3,037,897 A | 6/1962 | Pelley | |
| 3,237,834 A | 3/1966 | Davis et al. | |
| 3,537,929 A | 11/1970 | Keith et al. | |
| 3,555,232 A | 1/1971 | Bleackley | |
| 3,715,551 A | 2/1973 | Peterson | |
| 3,749,874 A | 7/1973 | Edgar | |
| 3,813,801 A | 6/1974 | Vander Schaaf | |
| 3,988,521 A | 10/1976 | Fumel et al. | |
| 4,261,501 A | 4/1981 | Watkins et al. | |
| 4,435,344 A | 3/1984 | Iioka | |
| 4,483,889 A | 11/1984 | Anderson | |
| 4,783,287 A | 11/1988 | Eichberger et al. | |
| 5,145,107 A | 9/1992 | Silver et al. | |
| 5,249,736 A | 10/1993 | Eisman | |
| 5,326,019 A | 7/1994 | Wolff | |
| 5,385,260 A | 1/1995 | Gatcomb | |
| 5,431,333 A | 7/1995 | Lorenz | |
| 5,490,631 A | 2/1996 | Iioka et al. | |
| 5,542,599 A | 8/1996 | Sobol | |
| 5,685,480 A | 11/1997 | Choi | |
| 5,697,550 A | 12/1997 | Varano et al. | |
| 5,705,238 A | 1/1998 | Anderson et al. | |
| 5,775,577 A | 7/1998 | Titus | |
| 5,826,786 A | 10/1998 | Dickert | |
| 5,908,152 A | 6/1999 | Tullis | |
| 5,950,917 A | 9/1999 | Smith | |
| 5,952,068 A | 9/1999 | Neale et al. | |
| 5,993,705 A | 11/1999 | Grishchenko et al. | |
| 6,027,018 A | 2/2000 | Yocum | |
| 6,039,682 A | 3/2000 | Dees | |
| 6,152,363 A | 11/2000 | Rule, Jr. | |
| 6,182,890 B1 | 2/2001 | Sattler et al. | |
| 6,186,394 B1 | 2/2001 | Dees | |
| 6,224,954 B1 | 5/2001 | Mitchell | |
| 6,257,485 B1 | 7/2001 | Sadlier et al. | |
| 6,265,040 B1 | 7/2001 | Neale et al. | |
| 6,267,837 B1 | 7/2001 | Mitchell | |
| 6,277,454 B1 | 8/2001 | Neale et al. | |
| 6,287,247 B1 | 9/2001 | Dees | |
| 6,287,410 B1 | 9/2001 | Klemarewski | |
| 6,437,303 B1 | 8/2002 | Dorr et al. | |
| 6,536,657 B2 | 3/2003 | Van Handel | |
| 6,586,075 B1 | 7/2003 | Mitchell | |
| 6,729,534 B2 | 5/2004 | Van Handel | |
| 6,787,245 B1 | 9/2004 | Hayes | |
| 6,802,938 B2 * | 10/2004 | Mohan | D21H 21/54 162/100 |
| 6,811,843 B2 | 11/2004 | DeBraal et al. | |
| 6,919,111 B2 | 7/2005 | Swoboda et al. | |
| 6,926,197 B2 | 8/2005 | Hed et al. | |
| 7,074,466 B2 | 7/2006 | DeBraal et al. | |
| 7,281,650 B1 | 10/2007 | Milan | |
| 7,451,911 B2 | 11/2008 | Stepanek, Jr. | |
| 7,464,856 B2 | 12/2008 | Van Handel | |
| 7,464,857 B2 | 12/2008 | Van Handel | |
| 7,597,246 B2 | 10/2009 | Stepanek, Jr. | |
| 7,600,669 B2 | 10/2009 | Van Handel | |
| 7,614,993 B2 | 11/2009 | Van Handel | |
| 2002/0068139 A1 | 6/2002 | Polak et al. | |
| 2002/0071947 A1 | 6/2002 | Soane et al. | |
| 2002/0172784 A1 | 11/2002 | DeBraal | |
| 2002/0172818 A1 | 11/2002 | DeBraal et al. | |
| 2002/0182347 A1 | 12/2002 | DeBraal et al. | |
| 2003/0003251 A1 | 1/2003 | DeBraal et al. | |
| 2004/0011801 A1 | 1/2004 | Rodriguez | |
| 2005/0003122 A1 | 1/2005 | Debraal et al. | |
| 2005/0230405 A1 | 10/2005 | Dix | |
| 2005/0236468 A1 | 10/2005 | Sadlier | |
| 2006/0131316 A1 | 6/2006 | Bresler | |
| 2006/0144915 A1 | 7/2006 | Sadlier | |
| 2006/0196923 A1 | 9/2006 | Tedford, Jr. | |
| 2007/0017440 A1 | 1/2007 | Tang et al. | |
| 2007/0029036 A1 | 2/2007 | Fort | |
| 2007/0090116 A1 | 4/2007 | Xue Bin | |
| 2007/0098962 A1 | 5/2007 | Laprade | |
| 2007/0228134 A1 | 10/2007 | Cook | |
| 2008/0023538 A1 | 1/2008 | Robertson et al. | |
| 2008/0078825 A1 | 4/2008 | Puls et al. | |
| 2008/0087677 A1 | 4/2008 | Robertson | |
| 2008/0121681 A1 | 5/2008 | Wiedmeyer | |
| 2008/0251487 A1 | 10/2008 | Semersky et al. | |
| 2009/0121007 A1 | 5/2009 | Van Handel | |
| 2009/0214837 A1 | 8/2009 | Albenice | |
| 2009/0272736 A1 | 11/2009 | Cole | |
| 2009/0294520 A1 | 12/2009 | Stepanek, Jr. | |
| 2009/0321508 A1 | 12/2009 | Fu et al. | |
| 2010/0015374 A1 | 1/2010 | Fulwiler | |
| 2010/0032474 A1 | 2/2010 | Burton et al. | |
| 2010/0044424 A1 | 2/2010 | Van Handel | |
| 2010/0196610 A1 | 8/2010 | Chang et al. | |
| 2011/0081509 A1 | 4/2011 | Chang | |
| 2012/0048450 A1 | 3/2012 | Fu et al. | |
| 2012/0092091 A1 | 4/2012 | Kang | |

FOREIGN PATENT DOCUMENTS

| | | |
|---|---|---|
| CN | 201062138 | 5/2008 |
| DE | 2043418 A1 | 3/1972 |
| EP | 0818305 A2 | 1/1998 |
| FR | 2516447 A1 | 5/1983 |
| FR | 2865476 | 1/2004 |
| GB | 1116349 A | 6/1968 |
| GB | 2463881 A | 3/2010 |
| JP | H08175576 | 7/1996 |
| JP | 2000302178 | 10/2000 |
| JP | 2002173182 A | 6/2002 |
| JP | 2003154589 | 5/2003 |
| JP | 2003155077 | 5/2003 |
| JP | 2003531928 | 10/2003 |
| JP | 2005119733 A | 5/2005 |
| JP | 2005517078 | 6/2005 |
| JP | 2007056080 A | 3/2007 |
| KR | 20110123720 | 11/2011 |
| TW | 215666 | 1/1993 |
| WO | 0006637 | 2/2000 |
| WO | 0015405 A1 | 3/2000 |
| WO | 0211967 A1 | 2/2002 |
| WO | 2004113613 | 12/2004 |
| WO | 2005102847 A1 | 11/2005 |
| WO | 2006107636 | 10/2006 |
| WO | 2006113403 | 10/2006 |
| WO | 2007018899 A2 | 2/2007 |
| WO | 2007027712 | 3/2007 |
| WO | 2007126783 A1 | 11/2007 |
| WO | 2008124193 A1 | 10/2008 |
| WO | 2010039466 A2 | 4/2010 |
| WO | 2010151456 | 12/2010 |
| WO | 2012033998 | 3/2012 |
| ZA | 9900835 | 2/1999 |

OTHER PUBLICATIONS

Preliminary Examination Report on Patentability dated Oct. 8, 2008 for corresponding International Application No. PCT/US2007/007521 (6 pages).

Examination Report dated Jan. 19, 2009 for corresponding European Patent Application No. 07754092.0 (2 pages).

Written Opinion dated Feb. 17, 2009 for corresponding Singapore Patent Application No. 200807307-4 (8 pages).

Examination Report dated May 28, 2009 for corresponding Turkish Patent Application No. 2008/09185 (3 pages).

Examination Report dated Sep. 21, 2009 for corresponding Singapore Patent Application No. 200807307-4 (5 pages).

Examination Report dated Oct. 14, 2009 for corresponding Russian Patent Application No. 2008141055 (4 pages).

Office Action dated Feb. 2010 for corresponding Chinese Patent Application No. 200780018298.7 (14 pages).

Examination Report dated Mar. 5, 2010 for corresponding New Zealand Patent Application No. 571637 (2 pages).

(56) References Cited

OTHER PUBLICATIONS

Search Report and Written Opinion dated Apr. 15, 2010 for corresponding Singapore Patent Application No. 2010001881 (18 pages).
Office Action dated Jun. 7, 2010 for corresponding Taiwanese Patent Application No. 96111303 (5 pages).
Examination Report dated Jul. 1, 2010 for corresponding New Zealand Patent Application No. 571637 (2 pages).
Office Action dated Aug. 11, 2010 for corresponding Chinese Patent Application No. 200780018298.7 (12 pages).
International Search Report and Written Opinion dated Sep. 24, 2010 for corresponding International Application No. PCT/US2010/038677 (10 pages).
Partial European Search Report dated Sep. 2, 2010 for corresponding European Patent Application No. 10006809.7 (7 pages).
Examination Report dated Sep. 13, 2010 for corresponding Vietnamese Patent Application No. 1-2008-02687 (2 pages).
Office Action dated May 16, 2011 for corresponding Chinese Patent Application No. 200780018298.7 (13 pages).
Examination Report dated Jun. 9, 2011 for corresponding New Zealand Patent Application No. 593231 (2 pages).
Examination Report dated Sep. 15, 2011 for corresponding Malaysian Patent Application No. PI20083914 (3 pages).
Examination Report dated Sep. 16, 2011 for corresponding New Zealand Patent Application No. 593231 (1 pages).
Examination Report dated Sep. 27, 2011 for corresponding Australian Patent Application No. 2007245165 (2 pages).
Preliminary Report on Patentability and Written Opinion dated Jan. 12, 2012 for corresponding International Application No. PCT/US2010/038677 (7 pages).
Office Action dated Jan. 20, 2012 for corresponding Chinese Patent Application No. 200780018298.7 (3 pages).
Office Action dated May 7, 2012 for corresponding Japanese Patent Application No. 2009-504204 (5 pages).
Office Action dated May 14, 2012 for corresponding Phillippine Patent Application No. 1-208-502222 (2 pages).
Examination Report dated Jun. 26, 2012 for corresponding Australian Patent Application No. 2012200444 (3 pages).
Written Opinion dated Jul. 26, 2012 for corresponding Singapore Patent Application No. 201109426-5 (5 pages).
Office Action dated Aug. 27, 2012 for corresponding Chinese Patent Application No. 200780018298.7 (9 pages).
Office Action dated Sep. 10, 2012 for corresponding Japanese Patent Application No. 2009-504204 (5 pages).
Examination Report dated Jan. 16, 2013 for corresponding Canadian Patent Application No. 2,766,553 (2 pages).
Preliminary Report on Patentability and Written Opinion dated Jan. 8, 2015 for corresponding International Application No. PCT/US2013/046616 (8 pages).
Examination Report dated Jul. 21, 2015 for corresponding European Patent Application No. 10-725-580.4 (4 pages).
International Preliminary Report on Patentability dated Jun. 16, 2015, for related International Application No. PCT/US2013/050928, filed Jul. 17, 2013 (13 pages).
International Preliminary Report on Patentability for International Application No. PCT/US2011/048928, mailed Mar. 14, 2013 (14 pages).
International Search Report and Written Opinion of the International Searching Authority from corresponding International Application No. PCT/US2015/045299 dated Jan. 26, 2016, 17 pages.
Invitation to Pay Additional Fees and, Where Applicable, Protest Fee and Communication Relating to the Results of the Partial International Search for International Application No. PCT/US2011/048928, dated Mar. 27, 2012 (9 pages).
Invitation to Pay Additional Fees and, Where Applicable, Protest Fee and Partial International Search for related International Application No. PCT/US2013/050928, mailed Oct. 30, 2013, 7 pages.
Office Action from corresponding Chinese patent application No. 201380044374.7 dated Jun. 23, 2016, 6 pages.
Office Action issued in related Chinese Application No. 201410708435.1 dated Sep. 5, 2016, 8 pages.

\* cited by examiner

THERMALLY ACTIVATABLE INSULATING PACKAGING

RELATED APPLICATION

The present application is a continuation application of U.S. application Ser. No. 11/728,973, filed Mar. 27, 2007, now U.S. Pat. No. 9,056,712, which claims the benefit of the filing date under 35 U.S.C. §119(e) of Provisional U.S. Patent Application Ser. No. 60/789,297, filed Apr. 3, 2006, which is hereby incorporated by reference.

BACKGROUND

Consumers frequently purchase ready-made products, such as food and beverages, in disposable containers. Thermally insulated containers may be designed for hot or cold liquids or foods, such as hot coffee, iced-tea, or pizza. These containers may maintain the temperature of the liquid or food contents by preventing heat or cold transfer from the contents to the consumer's hand.

BRIEF SUMMARY

A package or container includes a side wall, the side wall having an inner surface and an outer surface. At least one of the inner surface or the outer surface of the side wall may be at least partially coated by a layer of a thermally expandable material. The material may be adapted to be expanded to provide thermal insulation.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

A package or container may be constructed of, and/or insulated with, a die cut blank, such as a sleeve. The die cut blank may be fixed to a container or it may be removable. Thermally-expandable material may be applied to the container and/or die cut blank. Expandable materials that are expanded in ways other than by temperature may also be used. The material may be expanded before reaching an end user, such as when the container and/or die cut blank are manufactured, and/or the material may be expanded only on end use and only in response to a determined temperature. The material may be used to aid with insulating capabilities of the container and/or die cut blank, and/or to add rigidity to the container and/or the die cut blank, such as to reduce a thickness of the material components of container and/or die cut blank.

Figure 1:
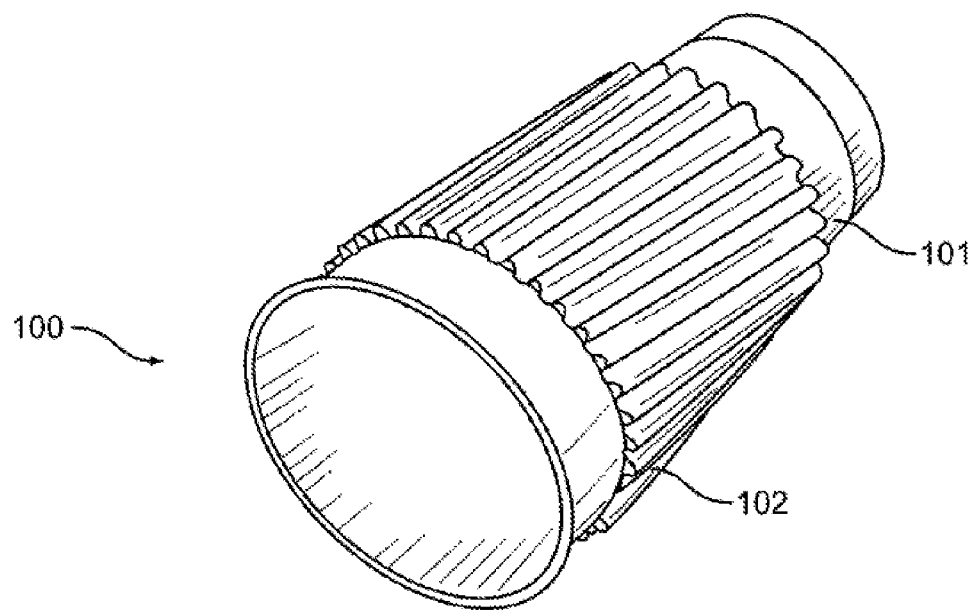
FIG. 1 is a perspective view of a cup assembled with a die cut blank.

FIG. 1 illustrates a container 101, such as a cup, and a die cut blank 102, such as a sleeve. The container is described in terms of a cup, for example, but may also include other containers such as a plate or tub. The blank may be in the form of a container sleeve or an outer wall to the container. The container is not limited to a cup and may be any other container, including but not limited to, a bulk coffee container, a soup tub, and press-formed containers, with or without covers or sleeves. The container 101 may be a cylindrical cup or a container having other geometrical configurations, including conical, rectangular, etc. The die cut blank is not limited to a corrugated die cut blank, and may be constructed of paperboard, paper, etc. The die cut blank 102 may be made of any nominal paper stock, including but not limited to, natural single-face, white-topped single face, coated bleached top single-face, corrugate, fluted corrugate or any combination of these. The die cut blank 102 may be removable from the container or the die cut blank may be adhered to the container 101. The blank 102 may be adhered, for example, by laminating the die cut blank onto the container, using a hot melt, cold melt and/or any other adhesive or sealing mechanisms. Alternatively or in addition, the blank may be adhered with an expandable material, such as a microsphere material. If the die cut blank is attached to the cup during manufacture, it may increase efficiency by eliminating an assembly step by the commercial end-user. Further, it may decrease the amount of storage space required by the commercial end-user, e.g., storing one item as opposed to two.

FIG. 1 is not necessarily drawn to scale. For example, the die cut blank 102 may cover a larger or smaller portion of the container's 101 surface than illustrated. For example, the die cut blank may provide full body coverage. Increasing the surface area of the die cut blank 102 may provide a larger insulated area as well as a larger print surface. Although the drawing illustrates the die cut blank on a cup, the die cut blank may be added to any other containers, such as but not limited to, a bulk beverage container, press-formed container, and soup tub.

A thermally activatable coating may be applied between the container 101 and the blank 102. The expandable material may be thermally-activatable, by a hot or cold temperature, and may be an expandable coating or adhesive, including but not limited to, binder, expandable microspheres or other micro-encapsulated particles, pigment and other additives, or any combination of these or other materials. The material may be expandable when wet or dry. The material may include any synthetic or natural material including aqueous based, solvent based, high solids, or 100% solid materials. The amount of solid content is typically 30% to 80% of the material, and more preferably 40% to 70%. Additional ingredients may be added to the binder, including but not limited to, pigments or dyes, fillers/extenders, surfactants for dispersion, thickeners or solvents to control viscosity for optimized application, defoaming agents, additives like waxes or slip aids, etc. Alternatively, the binder may be an adhesive. The expandable material may have several properties, including but not limited to thermal insulation to keep container contents hot or cold, and/or it may expand on contact with hot material (such as, over 150° F.), and preferably remains inactive before a determined designed activation temperature, such as at about room temperatures. The coating may be repulpable, recyclable, and/or biodegradable.

Figure 2:
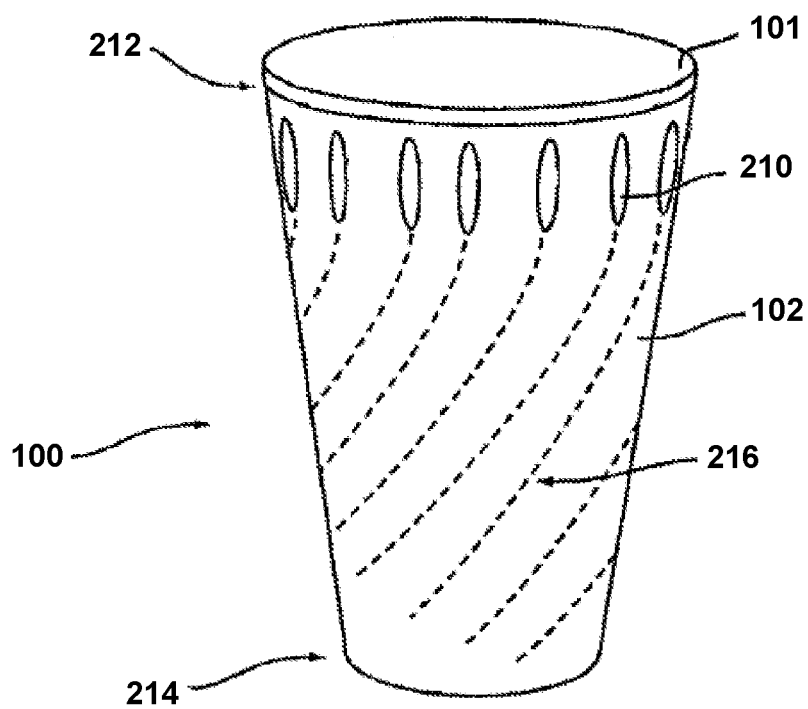
FIG. 2 is a perspective view of a cup assembled with a full-body die cut blank with openings.
Figure 3:
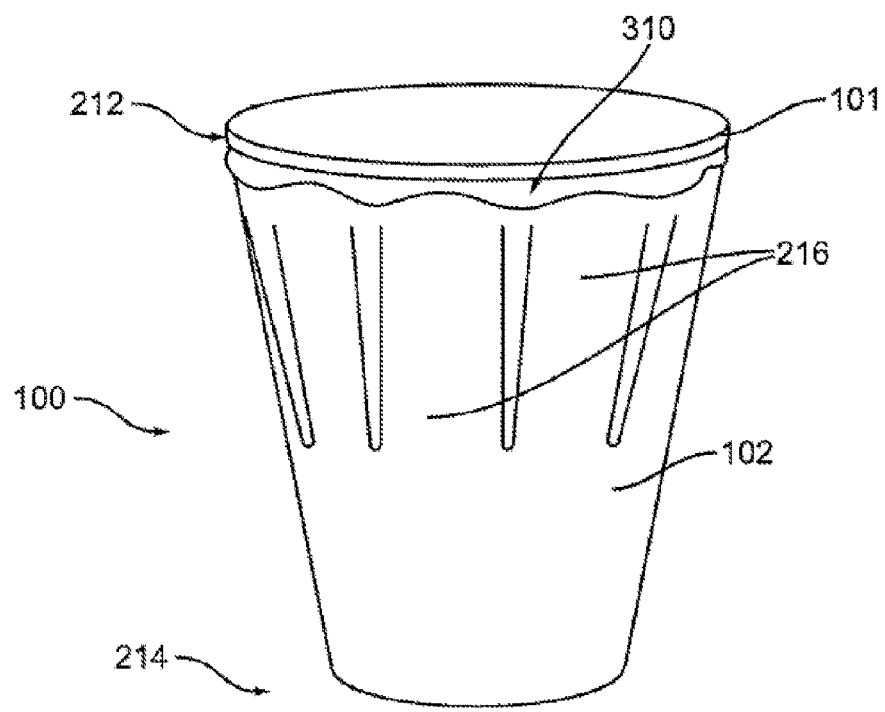
FIG. 3 is a perspective view of another integrated container with channels.

FIGS. 2 and 3 illustrate a container 101 with an outer wall of a die cut blank 102. The container 101 may be constructed as a double-wall cup assembly. The container 101 may be a cylindrical cup or container having other geometrical configurations, including conical, rectangular, etc. The die cut blank may fully or partially cover the body of the container. The die cut blank 102 may be an outer wall of the container 101. The container 101 and die cut blank 102 may be integrated into a cup 100 and the expandable material or adhesive may be applied between the container body 101 and the die cut blank 102. The activatable material may additionally have adhesive properties and thus may form the only attachment between the container and the blank. The die cut blank 102 may be made of any nominal paper stock, including but not limited to, natural single-face, white-topped single face, coated bleached top single-face or any combination of these. The die cut blank and/or container may be repulpable, recyclable and/or biodegradable. The die cut blank 102 may include, for example, corrugated, flute corrugated or embossed grooves. The grooves may be in a vertical, diagonal, or other direction and may channel heat away from the hands.

The die cut blank 102 may be removable from the container or the die cut blank may be adhered to the container. For example, a one-piece container, such as a cup, may be manufactured 101 by laminating the die cut blank onto the container, using a hot melt and expandable material to secure the die cut blank, or any other adhesive or sealing method. Alternatively, the thermally-activated material may be used to adhere the blank to the cup. If the die cut blank 102 is permanently attached to the container 101 during manufacture (e.g., creating an integrated one-piece cup), it may increase the efficiency of using a thermal die cut blank by eliminating an assembly step by the commercial end-user. Further, it may decrease the amount of storage space required by the commercial end-user, e.g., storing one item as opposed to two.

The die cut blank may remain open ended on one side or on opposing sides, which may permit airflow. For example, in FIG. 2, the container may contain openings 210 near the top 212 of the integrated container 100. The opening may be formed into the die cut blank, for example as holes, and the air flow may be created when the space between the container 101 and the die cut blank 102 is expanded by the expandable material. Airflow may be further manipulated, for example, upward and away from the holding fingers by corrugated, flute corrugated, or other channels in the die cut blank 102 or expandable material application pattern 216. For example, the pattern of application of the expandable material may create heat release channels 216.

FIG. 3 illustrates an alternate non-limiting example of how application of the expandable material may form openings 310 near the top 212 of the container 101. The channels may be formed on expansion of the material. There may be openings on opposing ends of the container 101, such as at the top 212 and the bottom 214. The openings may be formed by wrapping the die cut blank on the container without completing the seal at the top 212 or bottom 214.

Figure 4:
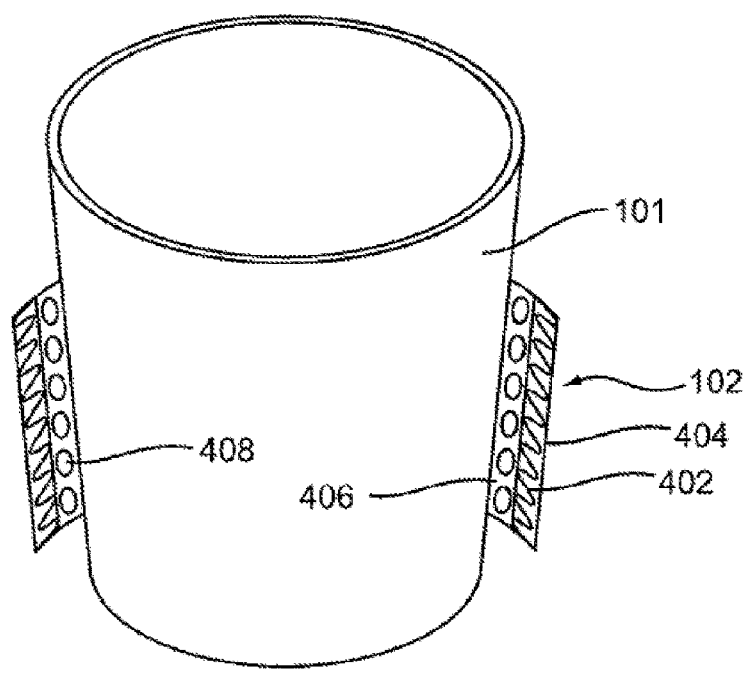
FIG. 4 is a cross section view of an assembled die cut blank.

FIG. 4 illustrates a cross section of a die cut blank 102 assembled with the cup 101. This figure is meant to be illustrative and not limiting. The cup may be replaced with any container, for example, a press-formed tray, a soup tub, or a bulk beverage container. The die cut blank 102 may have an inner face 406 and an outer face 404. An expandable material may be applied to the inner face 406, the outer face 404, and/or to a surface 402 between the inner face 406 and the outer face 404. The inner face 406 and outer face 404 do not necessarily contain a space therebetween. In another non-limiting example, the expandable material may be applied between the container wall 101 and the die cut blank 102 and may result in an integrated container 100.

A thermally-expandable material 408 may be applied to an inner face 406 of the die cut blank 102 in an inactive form. The inactivated material 408 may be applied as a thin film that does not materially alter the thickness of the die cut blank 102. Applying the expandable material to the inside of the die cut blank may also maintain the printability of the outer face of the die cut blank. If the inactivated expandable material 408 on the die cut blank 102 is assembled, for example, with a standard paper cup, it may maintain the slim profile of the cup. Maintenance of the slim profile may retain the efficient nesting qualities of a standard cup, allowing it to be efficiently cased, crated and shipped.

The expandable material 408 may be activated and thereby expanded by, for example, adding hot liquid, beverage or food into the container 101. Activation may occur only at the consumption stage and not at the processing stage of the die cut blank, such that the die cut blank may be shipped to the consumer with a substantially inactivated expandable material. For example, the activation point of the expandable material may be greater than about 120° F. and/or less than 60° F., such that the expandable material may be activated only by the temperature of hot liquids, beverages, or food and not activated by ambient or body temperature. The activation may cause the expandable material to expand and "push back" the die cut blank 102 from the container 101 creating an increased air gap. The air gap may create a thermal barrier between the hot beverage container 101 and the hand of the consumer. The activation may also enhance the stiffness and/or rigidity of the container, which may allow for a reduction in the material or thickness of the container wall. As described in more detail below, the coating may also be activated, or at least partially activated, before reaching the consumer.

The expandable material 408 may be applied to the die cut blank 102 in an unexpanded state. Expansion of the die cut blank may not occur until activated by adding hot fluid or solids, such as at the point of serving. This may be different from expanding the material during manufacture of the die cut blank. Expansion during manufacture may increase the bulk of the die cut blank. The expandable material may be controlled to effect nesting efficiency. The properties of the die cut blank may be further controlled by, for example but not limited to, combining a die cut blank constructed from fluted corrugate material with patterned application of expanded material to provide specific insulation, air flow characteristics and container rigidity enhancement. For example, the corrugation and/or the pattern of expandable material applied to the die cut blank may direct heat convection upward, and may therefore reduce heat transfer horizontally toward the holding hand of consumer. In other implementations, expansion may occur before shipping, such as before, during or after the manufacturing of the container.

Figure 5:
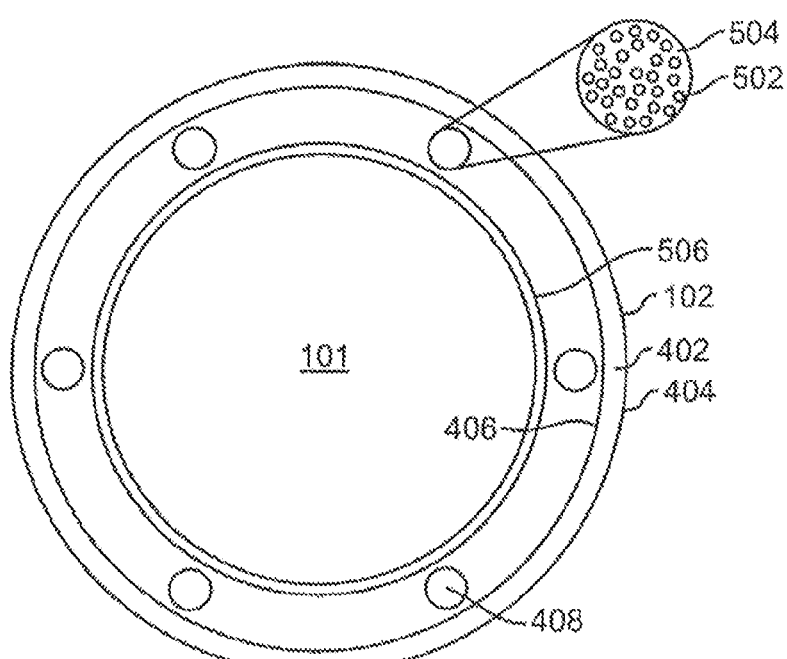
FIG. 5 is a top perspective view of a cross section of a cup assembled with a die cut blank.

FIG. 5 is an exemplary top view of a cross-section of a container 101 assembled with a thermal die cut blank 102. This figure is illustrative only and not limiting. The expandable material 408 may be applied to the inner-face 406 of the die cut blank 102. For example, the expandable material 408 may be applied between the die cut blank 102 and the wall of the container 101 and may form an integrated two-layer cup with thermally-activatable insulated expandable material in between. The expandable material may include, for example, expandable microspheres 502 dispersed in a binder or any other suitable material disclosed above 504 and may include an adhesive property.

Figure 6:
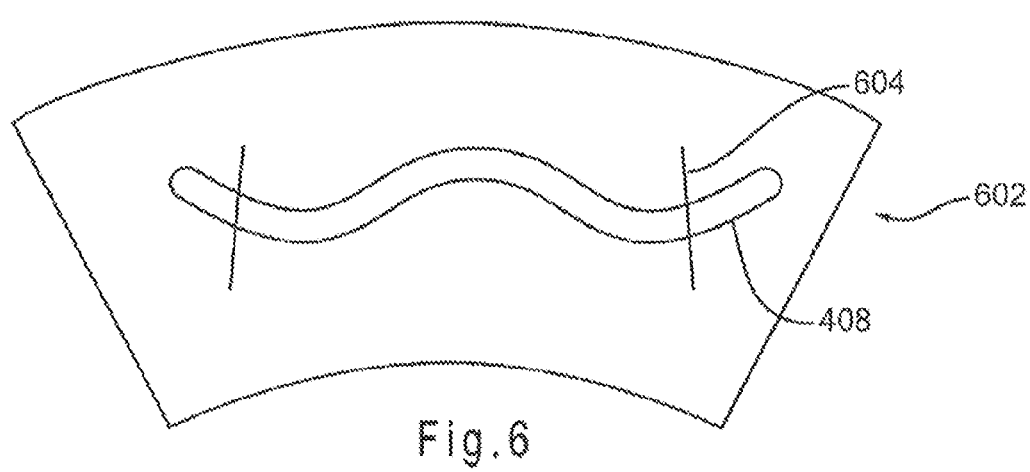
FIG. 6 is a view of a die cut blank disassembled from a cup.

FIG. 6 illustrates an exemplary die cut blank 602. This drawing is illustrative and not meant to be limited to a size or shape. The size and shape may be adapted to the dimensions of any container. An expandable material 408 may be applied to the die cut blank 602. The expandable material may be applied by a number of methods, such as but not limited to, a nozzle spray gun, printing, a slot coater, or other methods, such as those described in more detail below. The expandable material 408 may be applied to the die cut blank 602, for example, on an in-line cup wrapping machine, in-line on a folder/gluer, or by other suitable methods, such as off-line coating and drying. The expandable material 408 may be applied to the die cut blank 602 in any suitable pattern, such as but not limited to, banded, dotted, waved, squares, circles, diamonds, random, a combination of these or any other pattern. For example, the expandable material may be applied in a pattern that manipulates air flow and/or conducts heat, for example, vertically upward away from the holding fingers. The expandable material may be applied such that it forms channels, or expands to form channels on activation. The channels may direct the natural convection. The expandable material 408 may fully or only partially cover the surface being coated.

The coated die cut blank may be removably or permanently attached to a container or cup by, for example, wrapping the die cut blank around the container. For example, a one-piece cup or container may be manufactured 101 by laminating the die cut blank onto the container, using a hot melt and expandable material to secure the die cut blank, using an expandable material with adhesive properties, a combination of these or any other adhesive or sealing method. If the die cut blank 102 is permanently attached to the container 101 during manufacture (for example, creating an integrated one-piece cup), it may increase the efficiency of using a thermal die cut blank by eliminating an assembly step by the commercial end-user. Further, it may decrease the amount of storage space required by the commercial end-user (storing one item as opposed to two). The shape of the die cut blank in the drawing is not meant to be limiting. The shape of the die cut blank may be adapted to the shape of other containers, for example but not limited to, a soup tub, press-formed container, or bulk beverage containers.

The die cut blank 602 may, optionally, contain in-seam hot-melt 604 or cold-set glue. If the expandable material 408 is also an adhesive, the in-seam hot-melt or cold-set 604 may be omitted. The in-seam hot-melt/cold-set glue 604 may be used in addition to the expandable material 408, such as, for bonding reinforcement. The die cut blank may be applied to a cup by, for example, wrapping, laminating, or other manufacturing processes.

Figure 7:
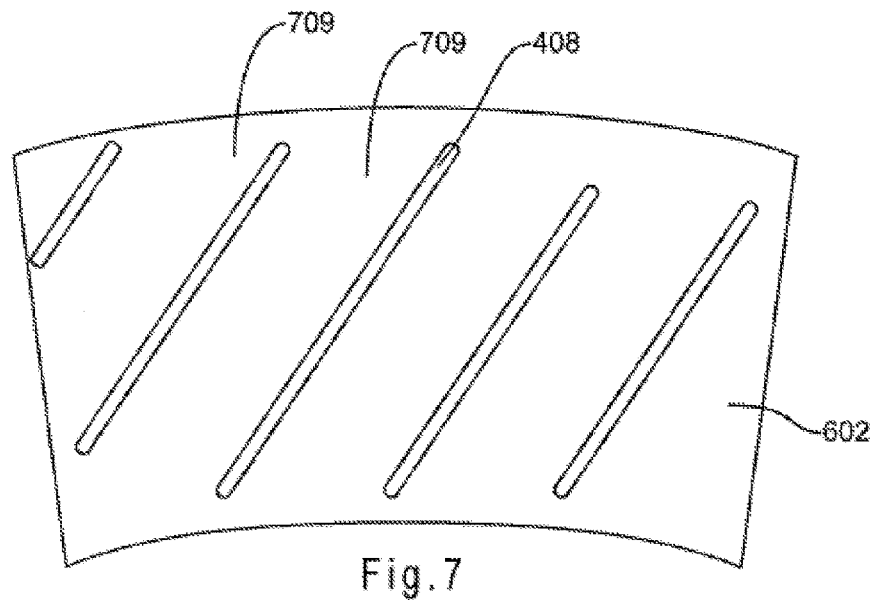
FIG. 7 is a view of a die cut blank disassembled from a cup.
Figure 8:
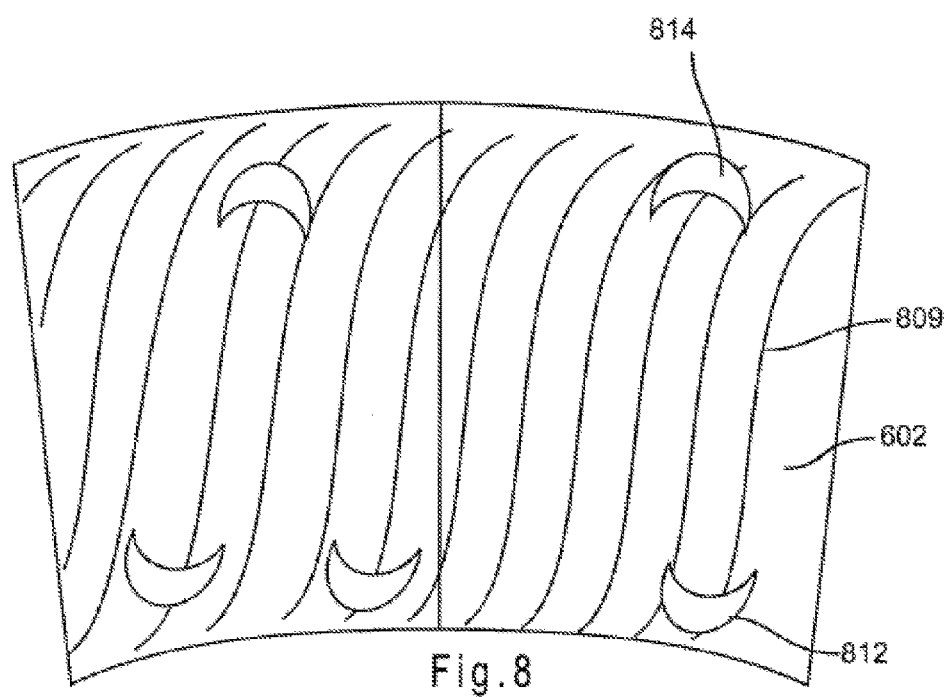
FIG. 8 is a view of a die cut blank disassembled from a cup.
Figure 9:
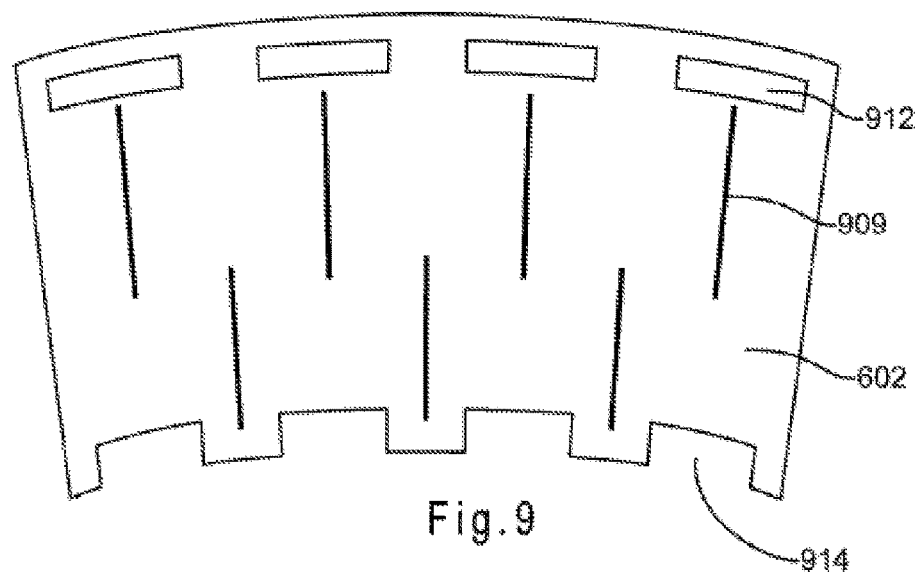
FIG. 9 is a view of a die cut blank disassembled from a cup.
Figure 10:
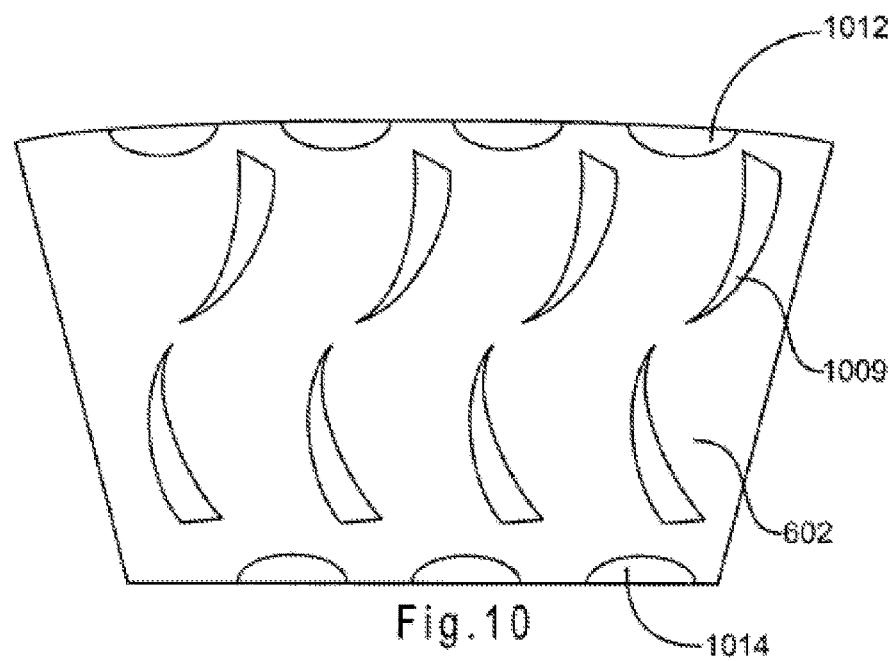
FIG. 10 is a view of a die cut blank disassembled from a cup.
Figure 11:
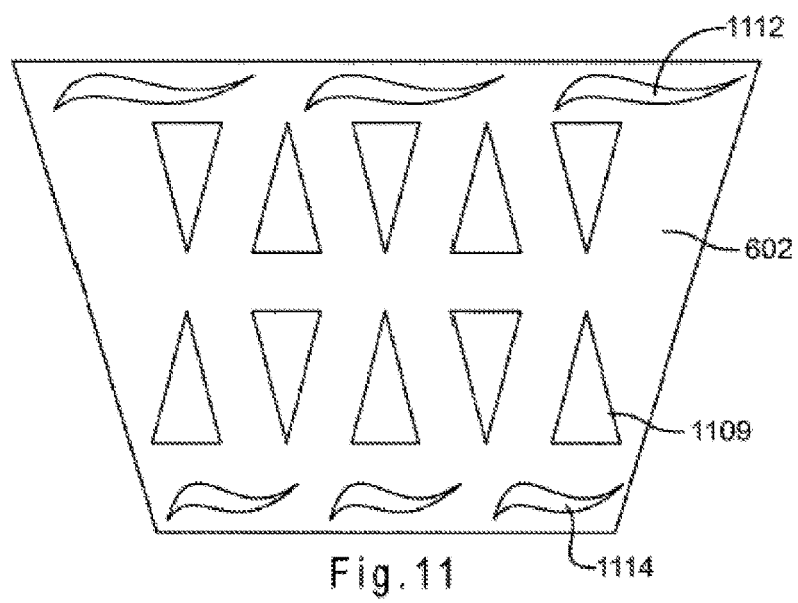
FIG. 11 is a view of a die cut blank disassembled from a cup

FIGS. 7 through 11 illustrate other examples of a die cut blank 402. These examples are merely illustrative and not limiting. FIG. 7 illustrates a die cut blank 602 with expandable material 408 applied in a pattern 709 to channel the release of heat. The die cut blank 602 may be made of, for example, corrugated paper, such as but not limited to fluted corrugate. Convection may be manipulated by corrugation, the pattern of application of the expandable material, or in another suitable manner.

FIGS. 8 through 11 illustrate other possible, non-limiting examples of potential patterns of expandable material. The patterns of expandable material are represented by numbers 809, 909, 1009, and 1109, respectively. The expandable material may be applied in patterns other than those illustrated in FIGS. 7-11. The pattern of expandable material 809, 909, 1009, and 1109, respectively, may vary in thickness and may provide graduated flow to channel heat to die cut openings. Die cut openings are represented by numbers 814, 912, 1012, and 1112, respectively. Die cut openings may also be located and/or include shapes such as illustrated by numbers 812, 914, 1014, and 1114. There may be die cut openings at opposing ends of the blank, or only at one end. The shapes of the die cut openings in FIGS. 8-11 are illustrative only and not limiting. For example, the patterns of expandable material and the shape of the die cut openings may be so arranged as to manipulate air flow, for example but not limited to, creating a Venturi effect.

Figure 12:
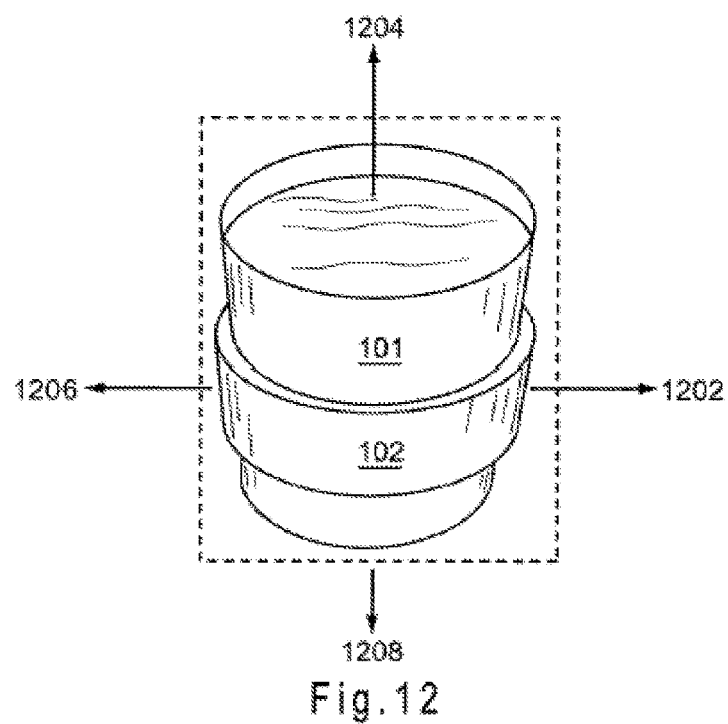
FIG. 12 is a view of a cup assembled with a die cut blank illustrating heat transfer.

FIG. 12 is an illustrative example showing exemplary heat transfer. This example is not meant to be limiting, but merely illustrative of possible heat loss manipulation. Total heat loss of the system may be represented by the following equation:

$$Q^T[\text{Cal./second}] = Q_1 + Q_2 + Q_3 + Q_4 \qquad 1.$$

Where $Q^T$ is the total heat loss. $Q_1$ 1204 may be the heat loss due to water evaporation. $Q_2$, $Q_3$, and $Q_4$, represented by 1202, 1206, and 1208, respectively, may represent the convectional and conductional heat loss.

The objective of keeping contents hot may be achieved by-minimizing $Q^T$. The die cut blank may minimize $Q^T$ by minimizing $Q_2$, $Q_3$, and $Q_4$. The low thermal conductivity of the expandable material may result in much lower heat loss due to $Q_2$, $Q_3$, and $Q_4$.

The objective of preventing consumer flesh burns may be achieved by, for example, minimizing $Q_2$, $Q_3$, and $Q_4$, especially $Q_2$, $Q_3$, while allowing $Q_1$ and $Q_4$ to channel the unavoidable high heat flux (due to the hot liquid) vertically up or down This may be achieved by, for example, adding corrugated grooves to the die cut blank. The grooves may be, for example, in a generally vertical or diagonally tilted.

Non-limiting examples follow.

EXAMPLE 1

Figure 17:
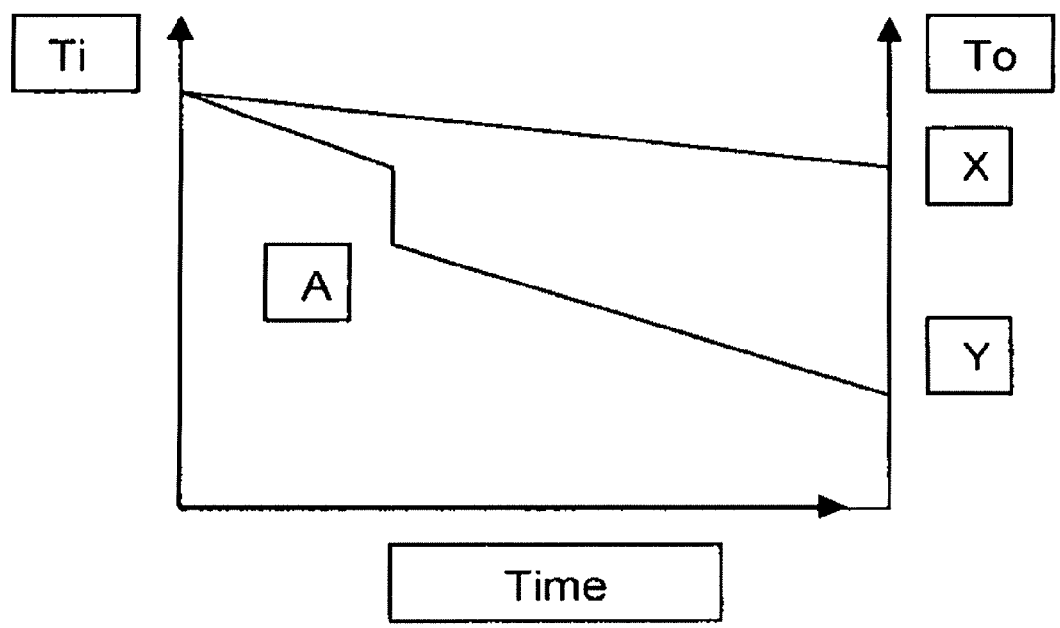
FIG. 17 shows a graphical representation of how an expandable material alters thermal conductivity of a cup.

FIG. 17 provides a graphical representation of how the expandable material may alter thermal conductivity. The temperature on the inside of a cup may be represented by Ti. The temperature on the outside of the cup may be represented by To. The top line, X, may represent a container without the coated die cut blank. The second line, Y, may represent a container assembled with a coated die cut blank.

This example may illustrate that, in a container without a die cut blank coated with the expandable material, the difference in the temperature inside versus the outside of the container may be very small. In a container with a die cut blank coated with the temperature activated material, the difference in the temperature between inside and outside may be small when the hot food or beverage is added to the container. However, the food or beverage may activate the material, A, on contact, causing the material to expand. When the material expands, the difference in temperature Ti–To, may increase.

EXAMPLE 2

Example 2 illustrates temperature sensory comparison of various die cut blank materials coated with the thermally-expandable material compared to without the thermally-expandable material. The following experiment is for illustration only and is not limiting, other experimental results might be obtained.

A thermally, or other, expandable material may be applied to die cut blanks made of various materials, such as but not limited to paper, paperboard, and fluted corrugated paper. Each die cut blank may be wrapped around a container, such as a cup. The cup may be filled with hot water. The cups may then be handled with bare hands and a comparison made between the sensory responses to the two conditions. In each test, the cups with coated die cut blanks were less "hot" to the touch than those with uncoated die cut blanks. Expansion occurred within a few minutes of pouring hot water into the cup.

EXAMPLE 3

Coatings may be applied by smearing the coating to a single face medium. The coating may be expanded when wet using a MASTER-MITE 120 V, 475 W heat gun at 600 degrees F.

EXAMPLE 4

Coatings may be applied to the outside of a 12 Oz cup and allowed to air-dry overnight. The next day, 190 degree F. hot water may be poured into the cup. Noticeable expansion may be observed shortly after filing the 190 degree F. hot water into the cup. Lids may be placed on the cup, and after 7 minutes more expansion may be observed, but still partial expansion. A benefit of post-heat activation may be that the hotter the liquid the more the coating expands.

EXAMPLE 5

Coating was applies to a cup. A 250 W IR heater manufactured by Fisher Scientific model no. 11-504-50 may be used to heat the coating. Expansion may be slow when the lamp is six inches away from the coating and immediate when one inch away from the coating. Excess heat and time may cause coating deformation from the substrate surface.

EXAMPLE 6

Coating may be applied to paper, which may them be wrapped around a paper cup after the coating is allowed to air dry. Heat from a heat gun may be used to heat the part of the coating indirectly through the paper shell for one minute. The coating expanded. Another part of the unheated coating may be heated under an IR lamp through the paper. The coating expanded.

Figure 13:
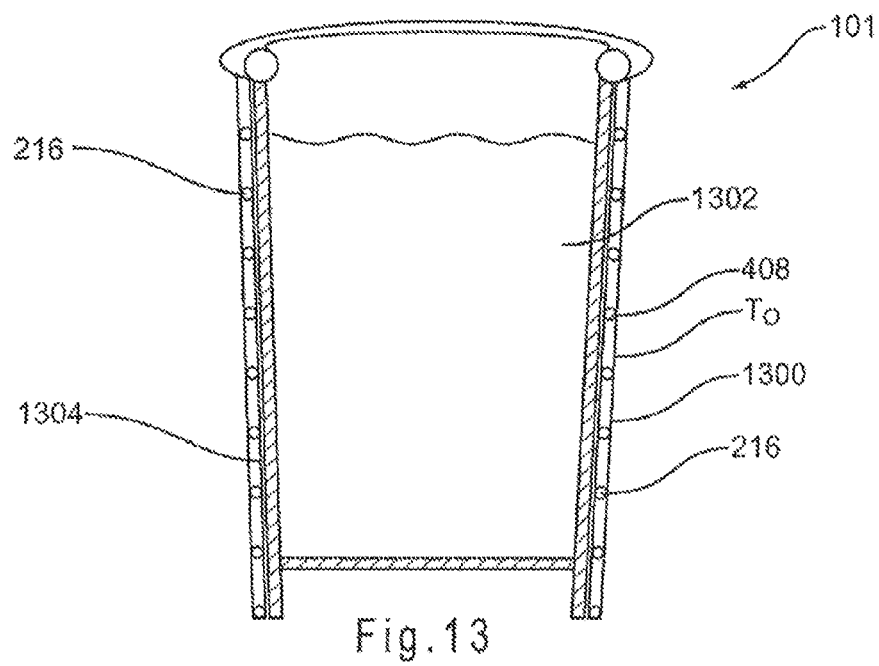
FIG. 13 is a side cutaway view of a double-wall cup.

FIG. 13 is a side cutaway view of a double wall container 101. The double wall container 101 may provide a jacket of air between an outer wall 1300 and contents 1302, such as a hot or cold beverage or food, of the container 101. The air jacket may provide thermal insulation as measured by an outside surface temperature $T_0$. The air jacket may partially or completely surround the container 101. When the container 101 is grabbed, a pressure exerted on the outer wall 1300 may act to collapse the outer wall 1300 at pressure points to reduce the air jacket and potentially initiate contact with an inner wall 1304 of the container 101. The air jacket may collapse under pressure points and may give a sense of low rigidity, and the contact may create hot spots on the outer wall 1300 if a thermally expandable coating 216 is not used.

If a sufficient amount of coating 216 is used, the coating 216 may act to provide rigidity without compromising the thermal insulation of the air jacket to the outer wall 1300 such that the outer wall 1330 does not collapse, completely or partially. The coating 216 may add mechanical strength to the container 101. Lighter weight materials may be used to produce the container 101 due to mechanical strength added by the coating 216, such that the source of a substrate forming the container 101 may be reduced. The coating 101 may be applied in spots, such as dots, or another pattern, either on the inner wall 1304, the outer wall 1300, or both, such that the coating 216 provides an air gap and prevents the container 101 from collapsing under holding pressure. The coating 101 may also provide a rigid feel to the user, while allowing a reduction of the substrate material.

Figure 14:
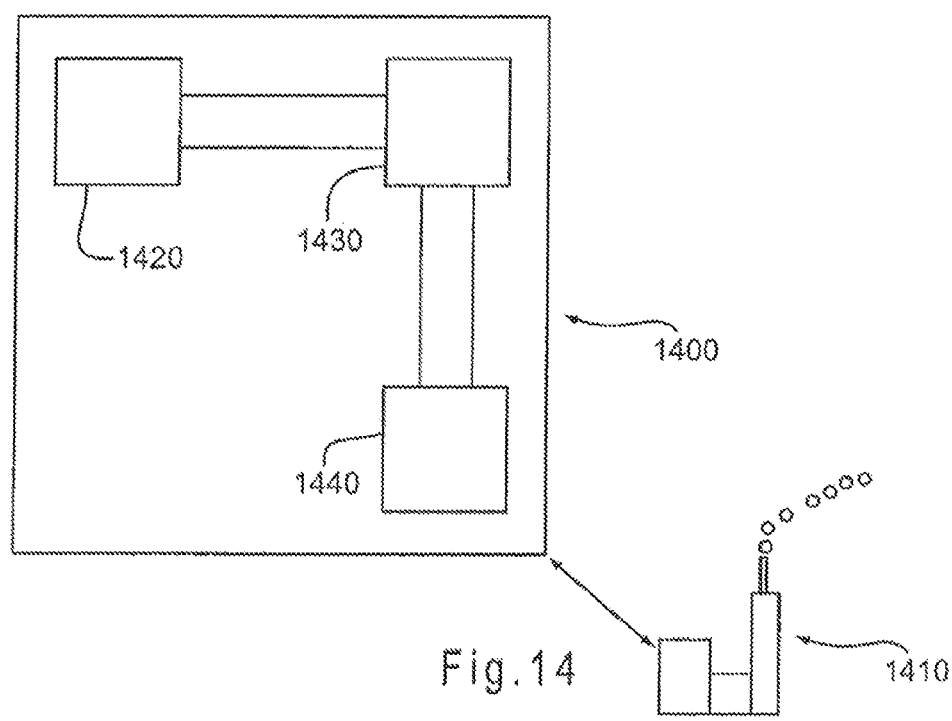
FIG. 14 is a block diagram of an exemplary process for applying a micro-particle coating to substrates.

FIG. 14 is a block diagram of an exemplary process for applying a micro-particle coating to substrates. The process may include applying a microsphere or other expandable coating to any of a substrate, die cut blank, container, sleeve, catering trays, double-wall cups, press-formed tray, soup tub and bag-in-the box containers. The process may include inline 1400 and off-line 1410 procedures. The inline procedure 1400 may include stacking stations 1420, manufacturing stations 1430, and packaging stations 1440 used for the manufacturing of the container from paper or die cut stock. The stacking, manufacturing and packaging stations may be completely automated and/or include manual stations.

Coating application processes may occur in-line 1400 or offline 1410, at the same or another facility. In-line application may include the application of the coating at one or more of the stacking stations 1420, manufacturing stations 1430, and packaging stations 1440. The coating may be applied in various ways, including but not limited to brushes, sponges, printing, a nozzle, spray, and a slot die coater. Any of these applications, or various combinations of them, may occur in-line 1400 or offline 1410, where the off-line process may occur before the stacking stage 1420.

Application with a brush or brushes may occur by feeding the coating with pressure through a tube to the brush. The brush may be manufactured from different materials such as horse hair or synthetic materials. The brush may include hollow filaments such that the coating is applied through the filaments. The brush may apply a swatch or pattern of the coating. The amount of coating to the brush may be controlled such that the amount of coating applied to the substrate may be metered. As an illustrative and not limiting example, the amount may be controlled such that a $1/64^{th}$ inch layer of coating is applied, which may expand to $1/16$ or $1/32$ of an inch, or the distance of the gap between an inner and outer layer of a double-wall cup. It may be preferable that the coating does not deform a shape of the outer layer once expanded. The coating may be distributed in a uniform or varying pattern. The brush may be used for broader applications, such as to coat the inside of a bag-in-the-box container.

Application with a printing press may occur by running substrates through rollers. The substrates may be roll or web form of paper stock, or alternatively in sheet form. The coating may be press applied in spots or patterns or with full coverage, depending on an implementation.

Figure 15:
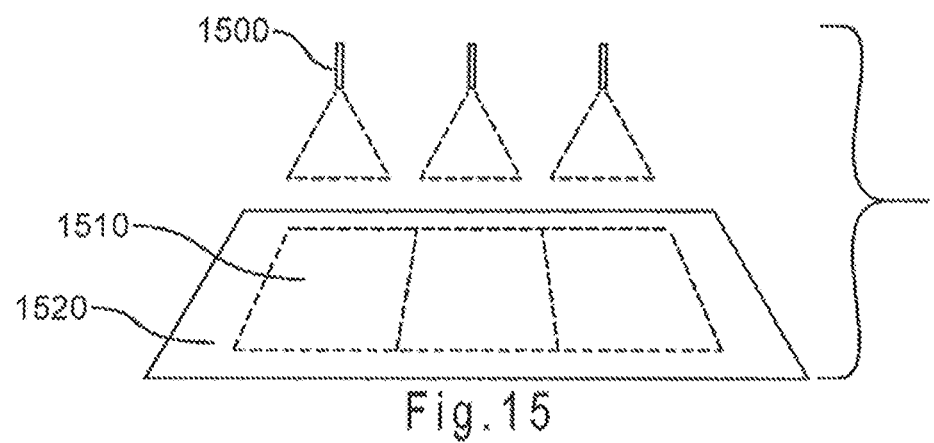
FIG. 15 is a schematic of applying a coating to a substrate with spray nozzles.

In FIG. 15, spray nozzles 1500 may be used to apply a coating 1510 to a substrate 1520. The nozzles may diffuse the coating to apply a thin, uniform layers of the coating on the substrate. One or more spray nozzles may be used to form continuous or interrupted patterns of the coating. The nozzles may be arranged such that the applied coatings overlap, are side-by-side and/or are separated by a space. The spray may be metered to control a thickness of the applied coating. The nozzle may also be positioned to direct spray of the coating onto designated portions of the substrate, such as at a corner.

Figure 16:
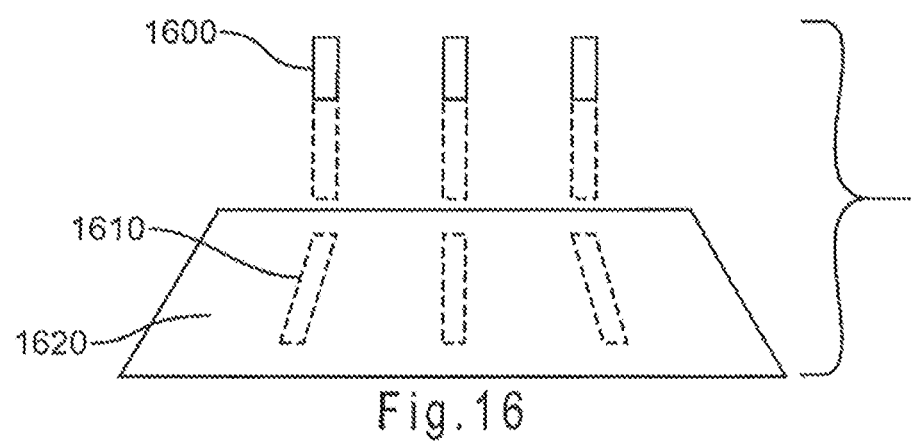
FIG. 16 is a schematic of applying a coating to a substrate with non-spray nozzles.

In FIG. 16, non-spray nozzles 1600 may be used to apply a stream 1610 of coating to the substrate 1620. The stream may be metered through the nozzle to apply a precise amount. The nozzle may to sized to control a specified width and height of the stream 1610. Flow from the nozzles may be turned on and off to accommodate a specified pattern of the coating to the substrate.

In a trough or a dip coating application, substrates may be moved through the trough that contains coating material. One or both sides of the substrate may be run through the trough. A thickness of the coating being applied to the trough may be controlled by how long the substrate sits in the material. A temperature of the coating and substrate may be controlled to activate or not activate the expandable coating during the coating process. A control blade may be used to meter off excess coating. The substrates may be belt fed though the through or individually held in the through.

With any of the above application processes, and with any other process, the applied coating may be dried or set, such as by applying or blowing cool air or warm air without activating the coating, if it is desired to expand the coating in a later process, such as during manufacturing or at the time of consumer use. The coating may also be expanded after manufacturing and before consumer use, such as at the stacking station 1440. The coating may be expanded before or after stacking the containers.

Coated or uncoated blanks may be fed to the stacking station 1420. The coating may be applied during in-line or off-line processing. If applied in-line, the coating may be allowed to dry before the cups, sleeves, containers, etc. are formed, or they may be formed while the coating is wet. Depending on the properties of the coating, it may take a couple of seconds to several minutes to dry. The coating may be activated during the in-line manufacturing or afterwards, such as at the consumer stage. To activate the coating in-line, any or all of infrared (IR), air, convection or conductive heating methods may be used. The coating may take a couple of seconds to several minutes to fully expand. For example, a mandrel, which holds a container from the inside of the container, and/or a collar, which holds a cup from the outside of the container, may be used to apply heat to expand the coating during the container manufacturing process. If a wet or partially dry coating contacts the mandrel during process, the mandrel may be manufactured to include a non-stick material, such as TEFLON to prevent sticking or transfer of the coating onto the mandrel. Lower activation temperatures may be preferred if the activation occurs in-line. By activating the coating, the coating expands to form a reinforced air gap. The coating may be partially expanded during manufacturing of the container, and then the expansion may continue to the consumption stage.

As mentioned, use of the coating may help to reduce the thickness of substrate needed to make the container, sleeves, etc., while maintaining a better rigid feel to the consumer. The coating may also improve insulation properties of the container, and to help keep the beverages or foods warm or cold longer, depending on the application. The substrates may be made of natural fibers, synthetic or both, such as SBS (solid bleached sulfate) paper board or box board. A sleeve materials, such as liner and medium, may be produced of 15 LB/3000 $ft^2$ to 100 LB/3000 $ft^2$ material, and preferably 18 LB/3000 ft to 50 LB/3000 $ft^2$. The caliper of the paper substrate for hot or cold cups, soup tub, press-formed container and other non-corrugated containers may range from 9 point to 24 point, and preferably 10 point to 24 point, where a point is equal to 1/1000 inch.

While various embodiments of the invention have been described, it will be apparent to those of ordinary skill in the art that many more embodiments and implementations are possible that are within the scope of the invention.

We claim:

1. A double-wall container, comprising:
an inner wall;
an outer wall attached to the inner wall, where the inner wall and the outer wall form an air gap therebetween;
an expandable coating comprising expandable microspheres, the expandable coating applied between the inner wall and the outer wall such that the expandable coating engages both the inner wall and the outer wall, the expandable coating having expanded, non-ruptured microspheres when the outer wall is permanently attached to the inner wall; and
an adhesive material different than the expandable coating, the adhesive material applied between the inner wall and the outer wall and attaching the inner wall to the outer wall.

2. The double-wall container of claim 1 where the expandable coating engages both the inner wall and the outer wall, and where the expandable microspheres have an activation temperature not exceeding 190° F.

3. The double-wall container of claim 1 where the expandable coating provides thermal insulation between the inner wall and the outer wall.

4. The double-wall container of claim 1 where the expandable coating provides a rigidness to the outer wall.

5. The double-wall container of claim 1 where the outer wall is comprised of a paper stock.

6. The double-wall container of claim 5 where the expandable coating accommodates a reduction in a weight of the paper stock.

7. The double-wall container of claim 1 where the expandable coating is activated to expand by a hot temperature.

8. The double-wall container of claim 1 where the expandable coating is applied in a dot pattern.

9. The double-wall container of claim 1 where the adhesive material is a hot melt adhesive.

10. The double-wall container of claim 1 where the inner and outer walls are of a paper stock material.

11. The double-wall container of claim 10 where the paper stock material is provided in roll or web form.

12. The double-wall container of claim 11 where the paper stock material is flexible to be provided in roll or web form.

13. The double-wall container of claim 10 where the paper stock material of the inner wall is different from the paper stock material of the outer wall.

14. A method of making a double-wall container, comprising:
providing a first substrate;
providing a second substrate;
applying a thermally expandable material to at least one of the first substrate and the second substrate, the expandable material comprising microspheres;
applying an adhesive material different than the expandable material, the adhesive material applied between the first substrate and the second substrate;
attaching the first substrate and the second substrate such that the adhesive material attaches the first substrate to the second substrate; and
expanding the expandable material, the expandable material having expanded, non-ruptured microspheres when the first substrate is permanently attached to the second substrate.

15. The method of claim 14 where the expandable material is applied before forming the double-wall container.

16. The method of claim 14 where the expandable material is applied during the forming of the double-wall container.

17. The method of claim 14 further comprising expanding the expandable material during the forming of the double-wall container.

18. The method of claim 14 further comprising expanding the expandable material after forming the double-wall container.

19. The method of claim 14 where the expandable material is applied in a dot pattern.

20. The method of claim 14 where the expandable material engages both the first substrate and the second substrate, and where the expandable microspheres have an activation temperature not exceeding 190° F.

21. The method of claim 14 where the adhesive material is a hot melt adhesive.

22. The method of claim 9 where the first substrate and the second substrate are comprised of paper stock material.

23. The method of claim 22 where providing the first and second substrates comprises providing the first and second substrates in roll or web form.

24. The method of claim 23 where the paper stock is flexible to be provided in roll or web form.

25. The method of claim 22 where the paper stock material of the first substrate is different from the paper stock material of the second substrate.

26. A container, comprising:
a side wall having an inner surface and an outer surface;
an adhesive material, the adhesive material applied between the inner surface and the outer surface and attaching the inner surface to the outer surface; and
an expandable material different than the adhesive material applied to at least one of the inner surface or the outer surface of the side wall, the expandable material comprising expanded, non-ruptured microspheres when the outer surface is permanently attached to the inner surface.

27. The container of claim 26, where the expandable material engages both the inner surface and the outer surface, and where the microspheres have an activation temperature not exceeding 190° F.

28. The container of claim 26 where the side wall comprises a a sleeve for a cup.

29. The container of claim 26 where the side wall comprises a side of a container for holding a bag.

30. The container of claim 26 where the expandable material is expanded upon manufacturing.

31. The container of claim 26 where the material is expanded by a beverage or food.

32. The container of claim 26 where the expandable material is thermally expandable.

33. The container of claim 26 where the adhesive material is a hot melt adhesive.

34. The container of claim 26 where the side wall comprises a double-wall assembly including an inner wall having the inner surface and an outer wall having the outer surface that is radially outward from the inner surface.

35. The container of claim 34 where the inner and outer walls are of paper stock material.

36. The container of claim 35 where the paper stock material is provided in roll or web form.

37. The container of claim 36 where the paper stock material is flexible to be provided in roll or web form.

38. The container of claim 35 where the paper stock material of the inner wall is different from the paper stock material of the outer wall.

* * * * *